United States Patent [19]

Newlin et al.

[11] Patent Number: 6,011,909

[45] Date of Patent: Jan. 4, 2000

[54] ALERTING USER ENGAGED IN A FIRST COMMUNICATIONS SESSION ON A FIRST NETWORK TO A REQUEST TO ESTABLISH A SECOND COMMUNICATIONS SESSION ON A SECOND NETWORK

[75] Inventors: Douglas J. Newlin, Geneva; Timothy M. Burke, Algonquin; Robert D. Battin, Palatine, all of Ill.

[73] Assignee: Motorola, Inc., Schaumburg, Ill.

[21] Appl. No.: 08/779,083

[22] Filed: Jan. 6, 1997

[51] Int. Cl.[7] .................................................. H04L 12/00
[52] U.S. Cl. .................................. 395/200.57; 379/93.35; 379/215
[58] Field of Search ......................... 395/200.34, 200.57; 370/260, 264, 265, 353; 379/93.23, 93.35, 202, 204, 215, 93.21

[56] References Cited

U.S. PATENT DOCUMENTS

| | | | |
|---|---|---|---|
| 3,883,697 | 5/1975 | Brown | 179/18 BC |
| 4,782,442 | 11/1988 | Kojima et al. | 364/200 |
| 4,847,829 | 7/1989 | Tompkins et al. | 370/62 |
| 4,899,358 | 2/1990 | Blakeley | 379/67 |
| 4,922,523 | 5/1990 | Hashimoto | 379/96 |
| 4,953,159 | 8/1990 | Hayden et al. | 370/62 |
| 4,995,071 | 2/1991 | Weber et al. | 379/53 |
| 5,007,076 | 4/1991 | Blakley | 379/67 |
| 5,034,948 | 7/1991 | Mizutani et al. | 370/79 |
| 5,042,062 | 8/1991 | Lee et al. | 379/54 |
| 5,121,424 | 6/1992 | Mano | 379/165 |
| 5,195,086 | 3/1993 | Baumgartner et al. | 370/62 |
| 5,247,615 | 9/1993 | Mori et al. | 395/200 |
| 5,263,084 | 11/1993 | Chaput et al. | 379/142 |
| 5,278,889 | 1/1994 | Papanicolaou et al. | 379/53 |
| 5,329,308 | 7/1994 | Binns et al. | 348/14 |
| 5,343,240 | 8/1994 | Yu | 348/14 |
| 5,371,534 | 12/1994 | Dagdeviren | 348/14 |
| 5,418,625 | 5/1995 | Shimoosawa | 358/442 |
| 5,519,767 | 5/1996 | O'Horo et al. | 379/97 |
| 5,533,102 | 7/1996 | Robinson et al. | 379/67 |
| 5,534,914 | 7/1996 | Flohr et al. | 348/15 |
| 5,557,320 | 9/1996 | Krebs | 348/12 |
| 5,572,442 | 11/1996 | Schulhof et al. | 364/514 C |
| 5,583,924 | 12/1996 | Lewis | 379/412 |
| 5,615,339 | 3/1997 | Ban | 395/200.12 |
| 5,619,561 | 4/1997 | Reese | 379/142 |
| 5,621,662 | 4/1997 | Humphries et al. | 364/550 |
| 5,627,825 | 5/1997 | Barraclough et al. | 370/260 |
| 5,636,269 | 6/1997 | Eisdorfer | 379/215 |

(List continued on next page.)

OTHER PUBLICATIONS

CRTC Approves SmartPac with Visual Call Waiting: Bulletin, www.bell.ca/bell/eng/library/nr/96/sb96e109.htm, May 1996.

BellSouth Solutions Group, Call Waiting, www.flbsg.com/catalog/alphalist/alpha07k.html, 1996.

*Primary Examiner*—Lance Leonard Barry, Esq.
*Attorney, Agent, or Firm*—Terri S. Hughes

[57] ABSTRACT

An apparatus and method are provided for multimedia communications with multiple network functionality, such as conflict resolution for multiple simultaneous communication sessions involving separate and independent networks and call types, such as video and voice. The apparatus includes a first network interface, such as a cable interface (120), an ISDN interface (125) or a telephony interface (130), with the first network interface coupleable to a first network for communication of a first network signal; a second network interface, the second network interface coupleable to a second network for communication of a second network signal; a user interface such as a user/audio interface (135) for reception of a plurality of control signals; and a processor arrangement (143) responsive through a set of program instructions, when operably coupled, to determine a presence of a first network communication session, to further determine an occurrence of the second network signal, and upon the occurrence of the second network signal during the first network communication session, to provide a distinctive alert to the user interface during the first network communication session indicating the occurrence of the second network signal.

21 Claims, 2 Drawing Sheets

U.S. PATENT DOCUMENTS

| | | | |
|---|---|---|---|
| 5,640,196 | 6/1997 | Behrens et al. | 348/14 |
| 5,675,375 | 10/1997 | Riffee | 348/15 |
| 5,699,413 | 12/1997 | Sridhar | 379/98 |
| 5,734,589 | 3/1998 | Kostreski et al. | 364/514 A |
| 5,754,484 | 5/1998 | Perreault | 365/200 |
| 5,761,293 | 6/1998 | Newlin et al. | 379/230 |
| 5,764,748 | 6/1998 | Rosenthal et al. | 379/215 |
| 5,774,357 | 6/1998 | Hoffberg et al. | 364/188 |
| 5,784,448 | 6/1998 | Yaker | 379/215 |

ALERTING USER ENGAGED IN A FIRST COMMUNICATIONS SESSION ON A FIRST NETWORK TO A REQUEST TO ESTABLISH A SECOND COMMUNICATIONS SESSION ON A SECOND NETWORK

CROSS-REFERENCE TO RELATED APPLICATIONS

This application is related to the following United States Patent Applications, each incorporated by reference herein, with priority claimed for all commonly disclosed subject matter:

Newlin et al., U.S. patent application Ser. No. 08/658,792, filed Jun. 5, 1996, entitled "Audio/Visual Communication System and Method Thereof", (the "first related application");

Burke et al., U.S. patent application Ser. No. 08/706,100, filed Aug. 30, 1996, entitled "Apparatus, Method And System For Audio And Video Conferencing And Telephony", (the "second related application");

Burke et al., U.S. patent application Ser. No. 08/715,887, filed Sep. 18, 1996, entitled "Videophone Apparatus, Method And System For Audio And Video Conferencing And Telephony", (the "third related application");

Newlin et al., U.S. Pat. No. 5,761,293, filed Jun. 28, 1996, entitled "ISDN Communication System and Method Thereof", (the "fourth related application");

Burke et al., U.S. patent application Ser. No. 08/725,602, filed Oct. 3, 1996, entitled "Apparatus, Method And System For Wireline Audio And Video Conferencing And Telephony", (the "fifth related application"); and Burke et al., U.S. patent application Ser. No. 08/726,329, filed Oct. 3, 1996, entitled "Videophone Apparatus, Method And System For Wireline Audio And Video Conferencing And Telephony", (the "sixth related application");

Newlin et al., U.S. patent application Ser. No. 08/735,295, filed Oct. 22, 1996, entitled "Apparatus, Method And System For Multimedia Control And Communication", (the "seventh related application");

Burke et al., U.S. patent application Ser. No. 08/757,184 filed Nov. 27, 1996, entitled "Apparatus, Method And System For Wireless Audio And Video Conferencing And Telephony", (the "eighth related application"); and Newlin, U.S. patent application Ser. No. 08/763,159, filed Dec. 10, 1996, entitled "Apparatus, Method And System For Wireline Audio And Video Conferencing And Telephony, With Network Interactivity", (the "ninth related application").

FIELD OF THE INVENTION

This invention relates in general to audio, video and multimedia communications systems and, more specifically, to an apparatus and method for multimedia communications with multiple network functionality.

BACKGROUND OF THE INVENTION

The various related applications disclose apparatuses, methods and systems for multimedia communications, such as video conferencing and telephony, over a variety of communications channels, such as wireline, cable, and hybrid fiber coaxial cable, and utilizing a variety of communications networks, such as an Integrated Services Digital Network ("ISDN"), the Public Switched Telephone Network ("PSTN"), and cable networks.

One particularly interesting feature of the various apparatuses (and systems) disclosed in the related applications is their capability for simultaneous connection to multiple networks, such as simultaneous connection to ISDN, PSTN, and cable networks. Such simultaneous connectivity, however, creates a simultaneous need for conflict resolution capability or prioritization between potential conflicting uses involving different and independent networks. For example, conflict resolution capability may be needed when the user is engaged in a video conference over an ISDN line while an incoming PSTN call is being received. Prior art capabilities have been strictly limited to conflict resolution within a single line from a single network, for example, providing call waiting or a busy signal for additional PSTN calls while a PSTN call is in progress on the one line. Such prior art call waiting or busy signaling has also been under network control, rather than local control of the user. The prior art has not provided for such conflict resolution capability when multiple separate and independent networks may be involved. In addition, the prior art has not provided for such conflict resolution under the local control of the user, rather than network control.

Accordingly, a need has remained for providing an apparatus and method for multimedia communications with multiple network functionality and services, such as conflict resolution capability or prioritization between potential conflicting uses involving different and independent networks. Such multimedia communications with multiple network functionality preferably should be under local control, rather than network control. In addition, such multimedia communications with multiple network functionality preferably should include other intelligent network functionality or services such as multimedia caller identification, should be user friendly, easy to install and use, and should be relatively less expensive for in-home purchase and use by consumers and other subscribers.

DETAILED DESCRIPTION OF THE INVENTION

As mentioned above, a need has remained for providing an apparatus and method for multimedia communications with multiple network functionality, such as providing conflict resolution capability or prioritization between potential conflicting or contending uses involving separate and independent networks. For video conferencing, "video call waiting" is provided by the apparatus and method of the present invention. In addition, a need has remained for such multimedia communications with multiple network functionality to also include other intelligent network functionality or services such as multimedia caller identification. As discussed in detail below, the apparatus and method in accordance with the present invention provide such multimedia communications with multiple network functionality, are user friendly, easy to install and use, and should be relatively less expensive for in-home purchase and use by consumers and other subscribers.

Figure 1:
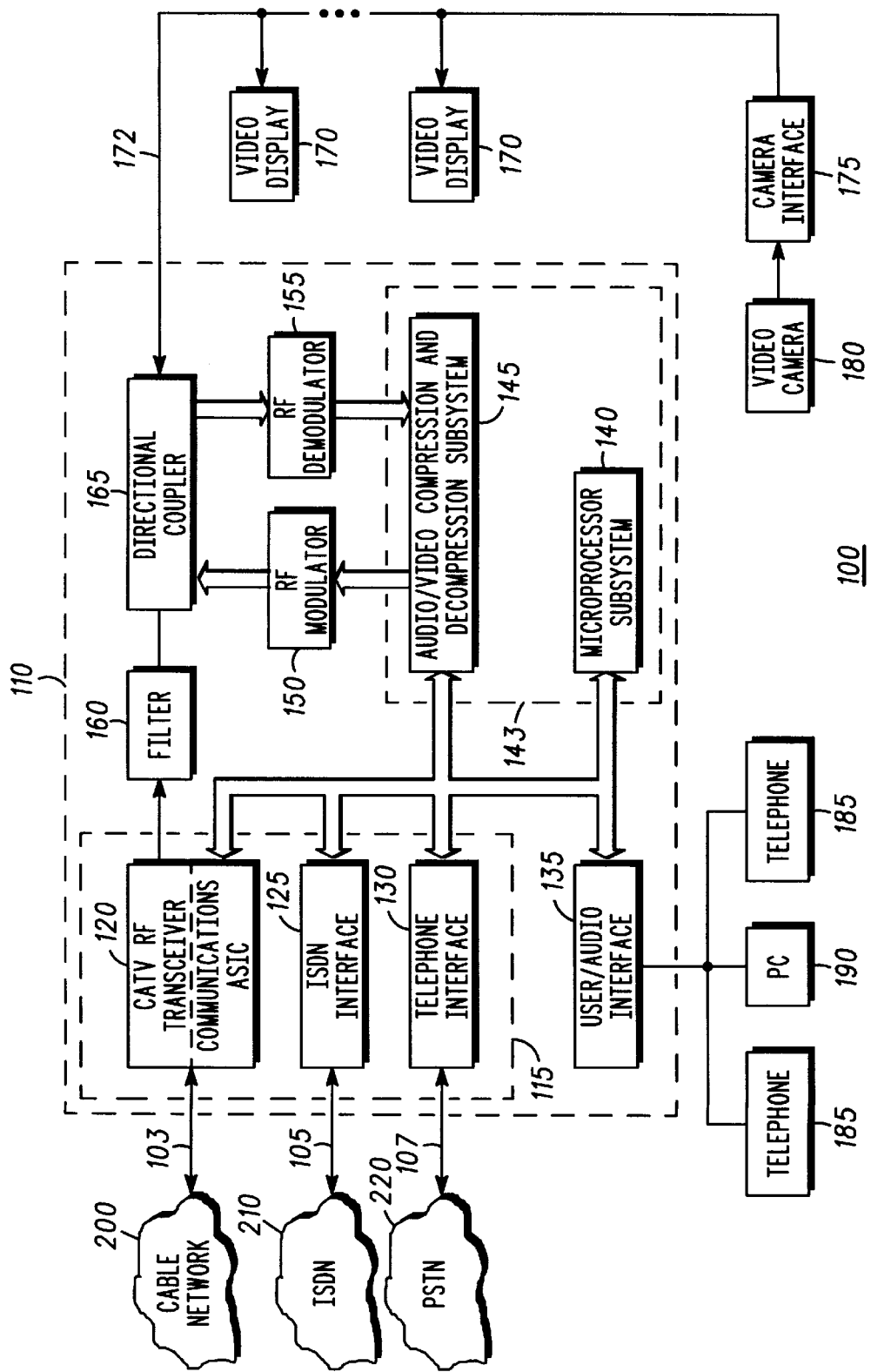
FIG. 1 is a block diagram illustrating an apparatus for multimedia communications with multiple network functionality in accordance with the present invention.

FIG. 1 is a block diagram illustrating an apparatus 110 for multimedia communications with multiple network functionality in accordance with the present invention. The various components comprising apparatus 110 have been disclosed and discussed in detail in the related applications, and in the interests of brevity, will not be elaborated upon herein. As illustrated in FIG. 1, the apparatus 110 is coupled or connected to three separate and independent networks, a first network such as cable network 200 (via first communication channel 103), a second network such as ISDN 210 (via second communication channel 105), and a third network such as PSTN 220 (via third communication channel 107). While illustrated with connection to three separate and independent networks, the apparatus 110 will typically be directly connected to only two networks, such as cable network 200 and PSTN 220 (although multiple networks also may be accessible through the cable network 200). The apparatus 110 is connected to these networks 200, 210 and 220 through the network interfaces 115, namely, cable network (CATV) radio frequency (RF) transceiver (with communications ASIC) 120, ISDN interface 125, and telephony (PSTN or POTS (plain old telephone service)) interface 130. The network interfaces 115 are connected to a processor arrangement 143, which in turn is comprised of a microprocessor subsystem 140 and an audio/video compression and decompression subsystem 145.

Continuing to refer to FIG. 1, the processor arrangement 143 is connected to an RF modulator 150 and an RF demodulator 155 which are utilized, respectively, to transmit and receive video signals on line (or channel) 172 (via directional coupler 165), such as for video conferencing. Video signals are typically transmitted as compressed signals, and corresponding compression and decompression occurs in the audio/video compression and decompression subsystem 145 utilizing protocols such as, for example, H.320 for ISDN or H.324 for PSTN video calls. Transmitted video signals (from a far end or remote party) are displayed on any of the video displays 170, while video signals to be received (and sent to the far end or remote party) are generated by the video camera 180 and camera interface 175. Video signals from a cable network, such as cable television signals, pass through filter 160 and directional coupler 165, and also may be viewed on the various video displays 170. The processor arrangement 143 is also connected to a user interface such as user/audio interface 135, which provides for audio input and output (via telephones 185), and also provides for the reception or entry of a plurality of control signals, discussed in greater detail below, which may include control signals input from a telephone 185, such as off hook, on hook, flash, various DTMF tones, or other programmed or programmable control signals, such as control signals input from a personal computer (PC) 190.

As discussed in the related applications, the processor arrangement 143 may be comprised of a single integrated circuit ("IC"), or may include a plurality of integrated circuits or other components connected or grouped together, such as microprocessors, digital signal processors, ASICs, associated memory (such as RAM and ROM), and other ICs and components. As a consequence, as used herein, the term processor arrangement should be understood to equivalently mean and include a single processor, or arrangement of processors, microprocessors, controllers, or some other grouping of integrated circuits which perform the functions discussed in greater detail below, with associated memory, such as microprocessor memory or additional RAM, ROM, EPROM or E²PROM. As discussed in greater detail below, the methodology of the invention may be programmed and stored, as a set of program instructions for subsequent execution, in the processor arrangement 143 with its associated memory and other equivalent components. In the preferred embodiment, as discussed in greater detail below, the processor arrangement 143 is responsive through a et of program instructions, when operably coupled (i.e., turned on and powered up), to determine a presence of a first network communication session, to further determine an occurrence of a second network signal, and upon the occurrence of the second network signal during the first network communication session, to provide a distinctive alert to the user interface (such as user/audio interface 135) during the first network communication session indicating the occurrence of the second network signal. The distinctive alert, for example, may be a special audio tone transmitted to a telephone 185, or may be a video caller identification displayed on one of the video displays 170. As discussed in greater detail below, the processor arrangement 143, in response to a first control signal of the plurality of control signals, is further responsive to establish a second network communication session during the first network communication session, enabling a user to have and maintain two separate and independent communication sessions, such as an ISDN video call and a POTS telephone call. In response to other control signals, the processor arrangement 143 is responsive to interchange or toggle between the various communication sessions, or combine or multiplex the communication sessions, such as displaying two video calls simultaneously in a split-screen or window format.

The distinctive alert generated by the processor arrangement 143 may have a variety of forms. For example, the distinctive alert for a PSTN 220 call may include caller identification information, which may be displayed on a separate device or displayed on one of the video displays 170. Such PSTN caller identification information is typically transmitted as inband FSK modulated data, which may then be demodulated (by the telephony interface 130) and decoded by the processor arrangement 143 for subsequent display. ISDN caller identification is typically included in Q.931 signaling information, which also may be parsed and presented to the user. In addition, certain callers (far end or remote parties) may also be identified or registered as video conferencing capable, which may also be utilized to indicate that an incoming call is a video call. This allows an intelligent method for either accepting or rejecting an incoming video or other call. In addition, each of the various combinations and permutations may be classified and utilized to generate a plurality of distinctive alerts, with each distinctive alert corresponding to a type of incoming second network signal, such as a first distinctive alert for an incoming ISDN video call, a second distinctive alert for an incoming PSTN video call, etc. Also as indicated above, the distinctive alerts may have a variety of forms, such as an audio tone, a caller identification, or a video display (e.g., a window format display of caller identification or of a video image of the caller), a voice message, announcement or another form of voice identification (e.g., a stored voice prompt or a voice announcement from the calling party).

As indicated above, this functionality is under the local control of the user, through the entry of the various control signals, not under network control. This is accomplished through the user/audio interface 135, which captures and interprets any control signals entered by the user, through the voice digital signal processor (DSP) discussed in the related applications. For example, if a control signal is a flash signal, such as the flash signal that currently in use for call waiting, rather than transmit the flash signal to a network as is currently done, the user/audio interface 135 captures and interprets the flash control signal locally only, to provide for functionality across the various separate and independent networks (rather than strictly within a one, given network). For example, a user engaged in a video conference call via, for example, the ISDN network 210 or the cable network 200, may simultaneously receive a POTS call via PSTN 220. Utilizing a local control signal, the user may maintain the video call in progress and answer the POTS call, followed by returning to the video call, terminating the video call, or multiplexing the POTS call with the voice portion of the video call.

Figure 2:
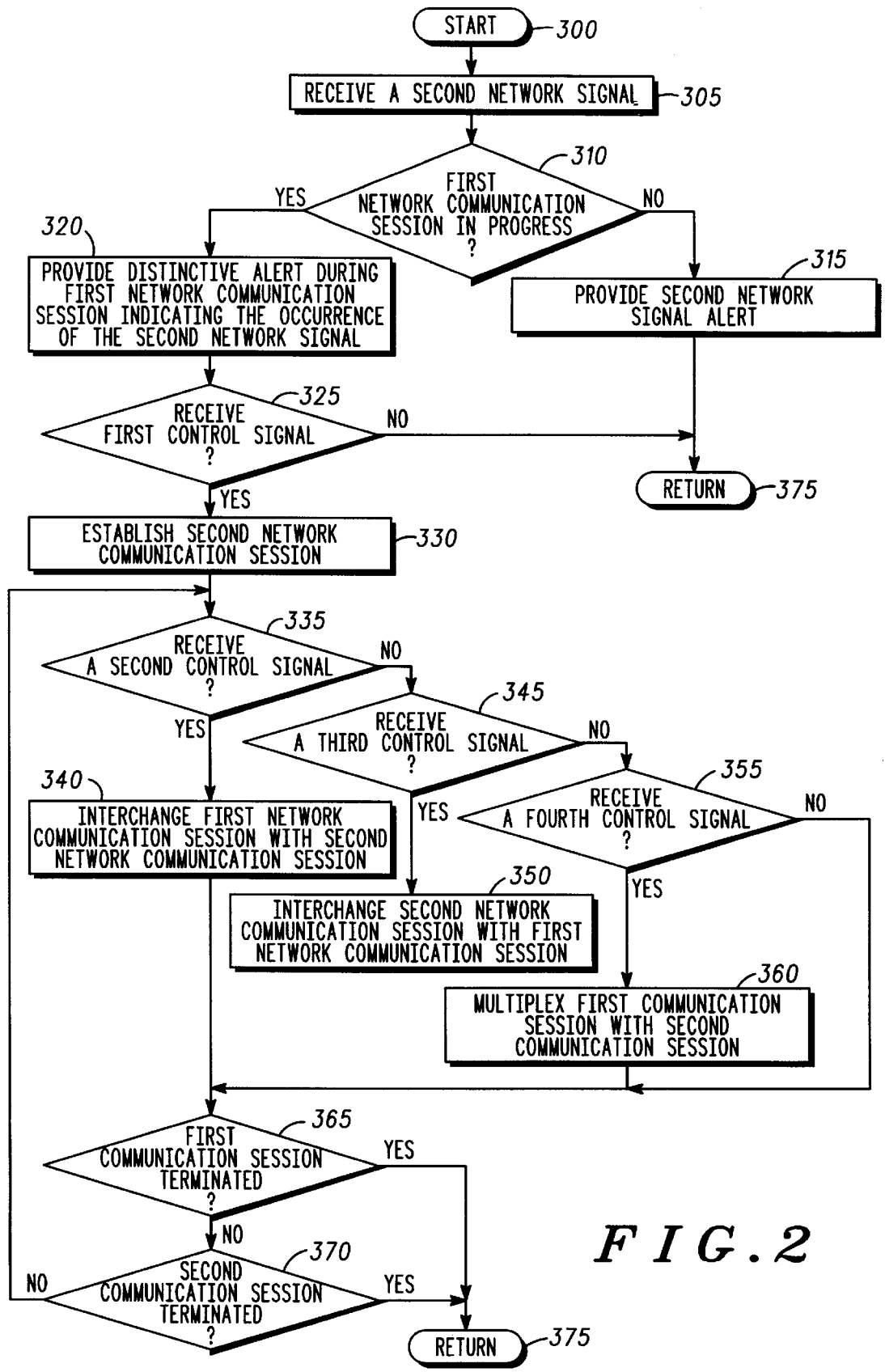
FIG. 2 is a flow diagram illustrating a method for multimedia communications with multiple network functionality in accordance with the present invention.

FIG. 2 is a flow diagram illustrating a method for multimedia communications with multiple network functionality in accordance with the present invention. As mentioned above, the method is programmed (and stored as a set of program instructions) in the processor arrangement 143 and any associated memory. Beginning with start step 300, a second network signal is received, step 305. The method then determines whether a first network communication session is in progress, step 310. If no first network communication session is in progress in step 310, then in step 315 a second network signal alert is provided, such as an incoming ring signal, and following step 315, no further steps need to be performed and the method may end, return step 375. When a first network communication session is in progress in step 310, then in step 320, the method (via processor arrangement 143) provides a distinctive alert during the first network communication session, indicating (and thereby notifying the user) of the second network signal. For example, a user engaged in a POTS voice call, as a first communication session, may hear a double beep tone as a distinctive alert notifying the user of an incoming ISDN video call. Following step 320, in step 325, the method determines whether a first control signal (of a plurality of control signals) has been received, and when a first control signal has been received (indicating that the user desires to establish a second network communication session), a second network communication session is established, step 330. Following the example above, a flash signal may be received, indicating that the user would like to establish the ISDN video call (during the POTS call, or terminating the POTS call (step 365, below)). If a first control signal is not received, the method may end, step 375, indicating that the user did not want to answer or accept the incoming second network signal.

Continuing to refer to FIG. 2, following the establishment of the second network communication session (concurrently or simultaneously with the first network communication session) in step 330, depending upon the control signal entered by the user, the user may choose to participate in either or both the first network and second network communication sessions. For example, utilizing a call waiting approach, the user may participate (communicate) in the second network communication session while the first network communication session is maintained on hold. For various networks, such as ISDN network 210, such holding may be accomplished by transmitting idle or other dummy bits. As a consequence, following step 330, when a second control signal (such as a flash) is received, step 335, the first network communication session is interchanged with the second network communication session, step 340, such as by putting the first network communication session on hold while participating in the second network communication session. Similarly, when a third control signal (such as a second flash signal) is received, step 345, the second network communication session is interchanged with the first network communication session, step 350, such as returning to the first network communication session from the second network communication session. When a fourth control signal (such as a double flash signal or a DTMF tone) is received, step 355, the first network and second network communication sessions are multiplexed, step 360, such as forming a conference call involving multiple parties or concurrently displaying two video conferencing images. When either the first network communication session is terminated in step 365 or the second network communication session is terminated in step 370, the method may end, return step 375. While both sessions continue, the method returns to step 335, for reception of any control signals which may be entered by the user.

Detection of a second incoming call, such as detection of the second network signal in step 305 above, is accomplished by the corresponding network interface (of the network interfaces 115), which signals the microprocessor subsystem 140 of various events. For example, a data access arrangement (DAA) on the telephony interface 130, as disclosed in the related applications, includes a ring detector which will signal the microprocessor subsystem 140 when ringing voltage is applied to the line as in an incoming call. However, ringing by itself does not determine the type of incoming call, audio-only or audio/video. As part of provisioning the apparatus 110, a unique directory number may be assigned for the POTS service and another number for the video call service with distinctive alerting, so that the subscriber (or other user) may audibly distinguish the type of call. However, for the apparatus 110 to automatically determine the type of call, it may also associate the ringing pattern with the type of call. This may be accomplished through a learning process where the microprocessor subsystem 140 "records" the ringing pattern associated with each type of call when received individually, and uses that information for call waiting purposes. This method of detection is highly desirable since the network interface is not "answered" or taken off hook unless the user makes this decision. Another method of determining the call type is for the telephony interface 130 to go "off hook" and analyze the received audio signal. A tone detection algorithm may be run to search for the presence of the characteristic carrier of a V.34 modem signal. If detected, the call is assumed to be a video call and presented to the user as such. With the ISDN interface 125, Q.931 messaging is used for incoming call determination and call acceptance. The same is true for the cable interface 120 (CATV RF transceiver with communications ASIC), in which specific CACS protocol messaging is used to inform the apparatus 110 of an incoming call, as disclosed in the related applications.

While the apparatus 110 is illustrated in FIG. 1 for three network types, such as cable, ISDN and PSTN, additional multimedia networks may also be supported. For example, the apparatus 110 may also be connected, through corresponding network interfaces, with a wireless network, with an Ethernet, or other packet-based networks, such as for Internet based video.

As may be apparent from the above discussion, the apparatus and method of the present invention provides numerous advantages. Most significantly, the present invention provides for conflict resolution between simultaneous communication sessions across different network types, and significantly separate and independent networks, and across different types of calls, such as voice and video calls. In addition, such conflict resolution is seamless across such network types and call types. Moreover, such multiple network functionality is under the local control of the user.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

What is claimed is:

1. An apparatus for multimedia communications with multiple network functionality, the apparatus comprising:

a first network interface, the first network interface coupleable to a first network for communication of a first network signal, wherein the first network is selected from a set of networks consisting of a cable network, an integrated services digital network or a public switched telephone network;

a second network interface, the second network interface coupleable to a second network for communication of a second network signal, wherein the second network is also selected from the set of networks, but a different selection from the first network;

a user interface for reception of a plurality of control signals; and a processor arrangement coupled to the first network interface, to the second network interface and to the user interface, the processor arrangement responsive through a set of program instructions, when operably coupled, to determine a presence of a first network communication session, to further determine an occurrence of a second network signal requesting establishment of a session on the second network, and upon the occurrence of the second network signal during the first network communication session, to provide a distinctive alert to the user interface during the first network communication session indicating the occurrence of the second network signal.

2. The apparatus of claim 1 wherein the processor arrangement, in response to a first control signal of the plurality of control signals, is further responsive to establish a second network communication session during the first network communication session.

3. The apparatus of claim 2 wherein the processor arrangement, in response to a second control signal of the plurality of control signals, is further responsive to interchange the first network communication session with the second network communication session.

4. The apparatus of claim 2 wherein the processor arrangement, in response to a third control signal of the plurality of control signals, is further responsive to interchange the second network communication session with the first network communication session.

5. The apparatus of claim 2 wherein the processor arrangement, in response to a fourth control signal of the plurality of control signals, is further responsive to multiplex the first network communication session with the second network communication session.

6. The apparatus of claim 1 wherein the first network and the second network are separate and independent.

7. The apparatus of claim 1 wherein the distinctive alert is an audio tone.

8. The apparatus of claim 1 wherein the distinctive alert is a caller identification.

9. The apparatus of claim 1 wherein the distinctive alert is a video caller identification.

10. The apparatus of claim 1 wherein the distinctive alert is a voice message.

11. A method for multimedia communications with multiple network functionality, the method comprising:

(a) determining a presence of a communication session on a first network, wherein the first network is selected from a set of networks consisting of a cable network, an integrated services digital network or a public switched telephone network;

(b) determining a presence of a signal on a second network requesting establishment of a session on the second network, wherein the second network is also selected from the set of networks but a different selection from the first network; and (c) providing a distinctive alert during the first network communication session indicating the presence of the second network signal.

12. The method of claim 11, further comprising:

(d) in response to a first control signal of a plurality of control signals, establishing a second network communication session during the first network communication session.

13. The method of claim 12, further comprising:

(e1) in response to a second control signal of the plurality of control signals, interchanging the first network communication session with the second network communication session.

14. The method of claim 12, further comprising:

(e2) in response to a third control signal of the plurality of control signals, interchanging the second network communication session with the first network communication session.

15. The method of claim 12, further comprising:

(e3) in response to a fourth control signal of the plurality of control signals, multiplexing the first network communication session with the second network communication session.

16. The method of claim 11 wherein the first network and the second network are separate and independent.

17. The method of claim 11 wherein the distinctive alert is an audio tone.

18. The method of claim 11 wherein the distinctive alert is a caller identification.

19. The method of claim 11 wherein the distinctive alert is a video caller identification.

20. The method of claim 11 wherein the distinctive alert is a voice message.

21. An apparatus for multimedia communications with multiple network functionality, the apparatus comprising:

a first network interface, the first network interface coupleable to a first network for communication of a first network signal;

a second network interface, the second network interface coupleable to a second network for communication of a second network signal, the second network being separate and independent from the first network;

a user interface for reception of a plurality of control signals; and a processor arrangement coupled to the first network interface, to the second network interface and to the user interface, the processor arrangement responsive through a set of program instructions, when operably coupled, to determine a presence of a communication session on the first network, wherein the first network is selected from a set of networks consisting of a cable network, an integrated services digital network or a public switched telephone network, to further determine a presence of a signal on the second network requesting establishment of a session on the second network, the second network also selected from the set of networks but a different selection from the first network, and upon the occurrence of the second network signal during the first network communication session, to provide a distinctive alert to the user interface during the first network communication session indicating the occurrence of the second network signal;

in response to a first control signal of the plurality of control signals, the processor arrangement further responsive to establish a second network communication session during the first network communication session;

in response to a second control signal of the plurality of control signals, the processor arrangement further responsive to interchange the first network communication session with the second network communication session;

in response to a third control signal of the plurality of control signals, the processor arrangement further responsive to interchange the second network communication session with the first network communication session; and in response to a fourth control signal of the plurality of control signals, the processor arrangement further responsive to multiplex the first network communication session with the second network communication session.

* * * * *